Aug. 10, 1926.
R. A. ANDERSON
WATER METER
Filed Oct. 10, 1921
1,595,063
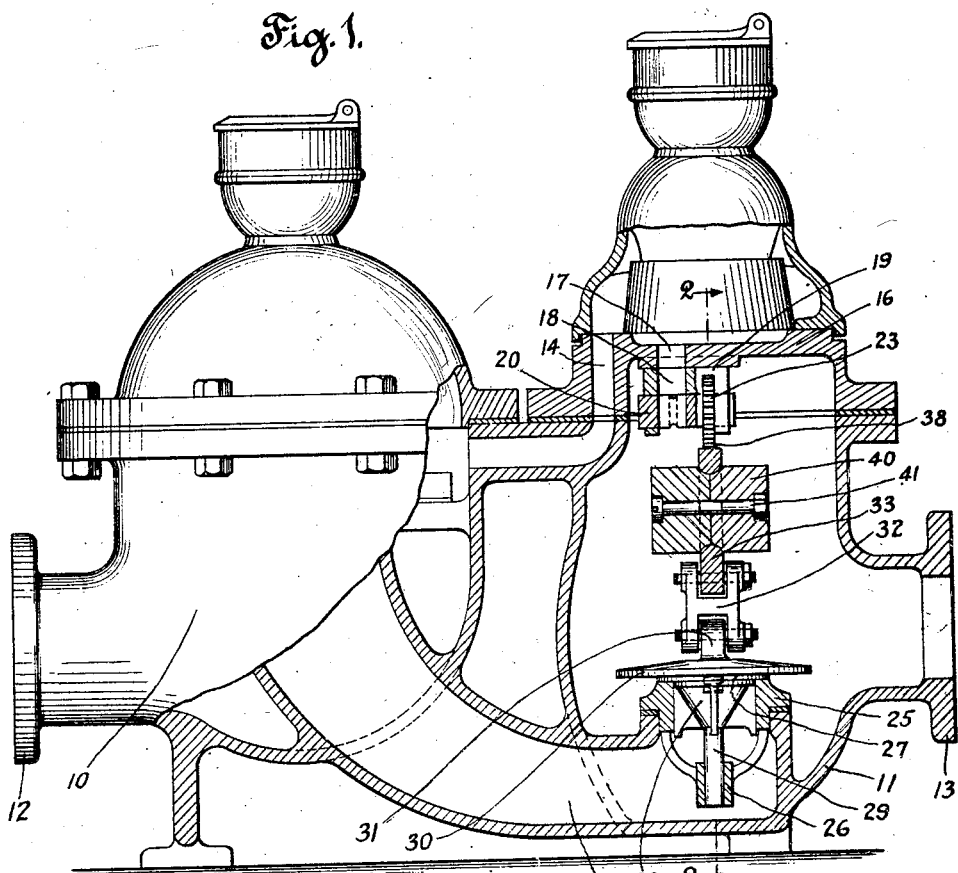
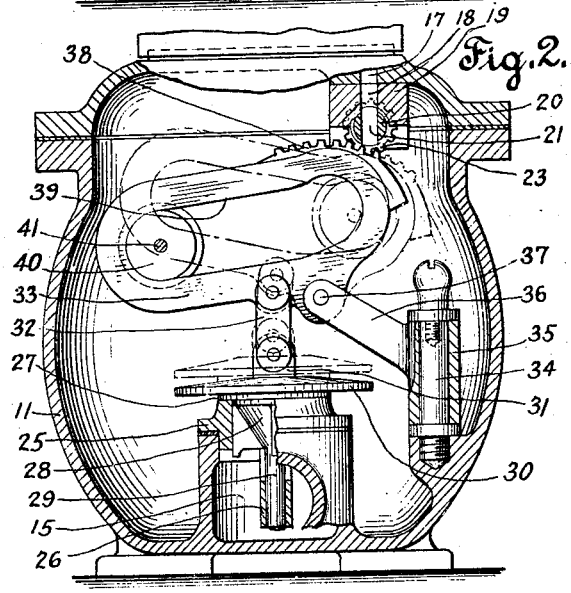
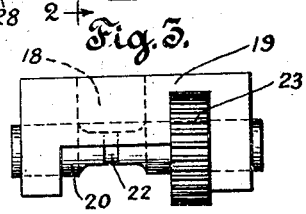
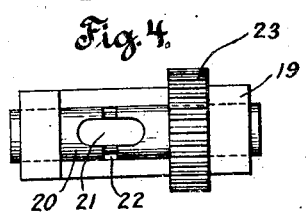
INVENTOR
Robert A. Anderson
BY Fredk C. Fischer
ATTORNEY Patented Aug. 10, 1926.

1,595,063

UNITED STATES PATENT OFFICE.

ROBERT A. ANDERSON, OF NEWARK, NEW JERSEY, ASSIGNOR TO GAMON METER COMPANY, OF NEWARK, NEW JERSEY, A CORPORATION OF NEW JERSEY.

WATER METER.

Application filed October 10, 1921. Serial No. 506,555.

The main object of the present invention is to provide means in a water meter adapted to deliver water under varying pressures and in variable quantities through independent valves, the selection of which is automatic and controlled by the water in its passage through the meter.

Another purpose is in the provision of means permitting a small but steady flow of water through the meter at all times, thereby avoiding freezing and consequent damage.

These and other analogous objects, which will become evident as the description proceeds, are attained by the novel design, construction and combination of elements hereafter explained and shown in the accompanying drawing, the same constituting an essential portion of this disclosure, and in which:—

Figure 1 is a partial side elevational, partial sectional, view of a compound water meter made in accordance with the invention, the low pressure valve being shown open.

Figure 2 is a partial transverse sectional view taken substantially on line 2—2 of Figure 1, the position of the high pressure valve when raised being shown in broken lines.

Figure 3 is a side elevational view of the low pressure valve in detail.

Figure 4 is a similar view of the same taken in a different plane.

In the drawing, the numeral 10, designates the high duty casing of a compound water meter and 11 the corresponding low duty casing, the same being comprised of upper and lower sections engaged by bolted flanges and provided respectively with a flanged inlet 12 and similar outlet 13.

The chamber in the domed upper section of the casing 11 is in communication with the chamber in the casing 10 through a relatively small passage 14 and the lower sections communicate through a larger passage 15.

A horizontal partition 16, below the outlet of the passage 14, contains a port 17 in register with an opening 18 in a valve seat element 19, secured to the under side of the partition, and mounted horizontally in this bored element is a cylindrical valve plug 20, containing a through transverse opening 21 adapted to close or open the port passage 18, thus controlling the flow therethrough.

At the center of the valve 20, registering with the port, is an annular groove 22, acting as a by-pass and permitting a limited flow of water at all times, this circulation tending to prevent freezing, as is well known may happen in an inert body of water exposed to extreme low temperatures to which such an apparatus is not infrequently subjected.

Fixed near one end of the valve 20 is a spur pinion 23 that, upon being rotated, obviously opens or closes the valve, the normal position of which is open when the meter has passing through it a moderate stream of water.

The passage 15, for supplying a greater quantity of water, terminates in an upturned mouth, at the bottom of the casing 11, and has secured in it an annular crown ring 25 having a depending guide 26 integrally attached by connecting arms.

The level upper surface of the ring 25 is finished as a seat receptive of the valve 27, having a depending winged cone 28 terminating in a spindle 29 slidably in the guide 26, the wings of the cone slidably fitting the bore of the ring 25.

Carried on top of the valve 27 is a disc 30 presenting a relatively large area and having a lug 31 at its center to which is pivotally connected the lower forked element of a H shaped link 32, its upper fork pivotally engaging a yoke 33.

In one side of the chamber casing 11 is secured a vertical stud 34 and upon it is mounted a sleeve 35 having an angular arm 36, forked at its extremity, receptive of the yoke 33, which is pivoted therein, as best shown in Fig. 2.

The pivot pin 37, used in connecting these elements, is located at the axial center of a series of spur gear teeth 38 formed on a segmental portion of the yoke, these teeth being in mesh with the pinion 23 of the rotary valve and by which it is actuated.

The yoke, which is flat and parallel throughout, extends opposite the point of link attachment, nearly to the wall of the casing, and formed substantially central in the yoke is an elongated slot 39 slidably engaging a weight 40, made in two sections connected by an axial bolt 41.

Under ordinary circumstances water flowing through the meter passage 14, after registering, enters the main chamber in the casing 11 by the rotary valve opening 21, finding egress through the outlet 13.

Should a greater quantity of water be required than can be transmitted in this manner, the reciprocatively operating valve 27 automatically rises, due to the demand, which releases pressure on the disc 30, and water in a greater volume enters the chamber through the passage 15 and ring 25 to be discharged at the outlet.

Obviously, when the valve 27 moves, the link connected yoke is caused to oscillate on the pivot 37, closing the rotary valve, if the disc valve rises, and causing the parts to assume the position shown in broken lines in Figure 2, the weight travelling in the slot and maintaining the parts in the manner indicated until the excessive demand has been supplied.

When a normal moderate quantity of water is required, the back pressure on the relative large exposed area of the disc 30 closes the valve 27, and turns the rotary valve co-incidentally into its open position, slight fluctuations in demand being held in abeyance by the weight.

Thus it will be seen that an apparatus for delivering variable quantities of water, according to the demand, and under internal self-control, has been disclosed, together with other novel and practical features.

As changes in construction could be made within the scope of the invention, it is intended that all matter contained in the foregoing description or shown in the accompanying drawing shall be interpreted as illustrative and not in a limitative sense.

Having thus described my invention, what I claim as new and desire to secure by Letters Patent, is:—

1. A compound water meter, comprising high and low duty meters, a casing enclosing said meters, said casing having inlets of unlike area leading to said meters and a single outlet therefrom, a rotatable cylindrical valve controlling the passage through the smaller inlet, said valve having a transverse passage and an annular groove intersecting the passage to constitute a by-pass, a reciprocatable valve controlling the passage through the larger inlet and operative connections between said valves adapted to close one while the other is open.

2. In a water meter containing high and low duty passages, a reciprocating valve controlling the high duty passage, a rotary valve having a by-pass and controlling the low duty passage, and means actuated by the movement of said reciprocating valve for operating said rotary valve, the by-pass in said rotary valve permitting a restricted flow at all times through said low duty passage, and a casing completely enveloping all of the mentioned elements.

This specification signed and witnessed this 7th day of October, 1921.

ROBERT A. ANDERSON.